United States Patent [19]

Iizuka

[11] Patent Number: 5,726,792
[45] Date of Patent: Mar. 10, 1998

[54] SCANNING LENS

[75] Inventor: Takashi Iizuka, Tokyo, Japan

[73] Assignee: Asahi Kogaku Kogyo Kabushiki Kaisha, Tokyo, Japan

[21] Appl. No.: 764,540

[22] Filed: Dec. 12, 1996

[30] Foreign Application Priority Data

Dec. 15, 1995 [JP] Japan .................. 7-348045

[51] Int. Cl.⁶ .................................. G02B 26/08
[52] U.S. Cl. .................. 359/205; 359/206; 359/207; 359/662; 359/782
[58] Field of Search ................... 359/205–207, 359/662, 710, 711, 715, 782; 347/258–259

[56] References Cited

U.S. PATENT DOCUMENTS

| | | |
|---|---|---|
| 4,277,128 | 7/1981 | Kawamura . |
| 4,756,584 | 7/1988 | Takanashi . |
| 5,087,983 | 2/1992 | Takahashi et al. . |
| 5,194,982 | 3/1993 | Morimoto . |
| 5,453,870 | 9/1995 | Iima . |

FOREIGN PATENT DOCUMENTS

| | | |
|---|---|---|
| 62-172317 | 7/1987 | Japan . |
| 63-15214 | 1/1988 | Japan . |
| 63-36482 | 7/1988 | Japan . |

Primary Examiner—James Phan
Attorney, Agent, or Firm—Greenblum & Bernstein, P.L.C.

[57] ABSTRACT

A scanning lens converges light deflected by a deflector onto a surface to be scanned, comprises a first lens having a negative power in both a main scanning direction and in an auxiliary scanning direction, a second lens having a positive power in both the main scanning direction and in the auxiliary scanning direction, a third lens having a positive power in both the main scanning direction and in the auxiliary scanning direction, and a fourth lens provided with a cylindrical surface having a negative power in the auxiliary scanning direction. The first, second, third and fourth lenses are arranged in this order from the deflector. The first, second and third lenses are formed so that curvature of field in the auxiliary scanning direction is reduced. A bow of an abaxial scanning line, which cannot be corrected by the first, second and third lenses, can be corrected by the cylindrical surface of the fourth lens.

9 Claims, 8 Drawing Sheets

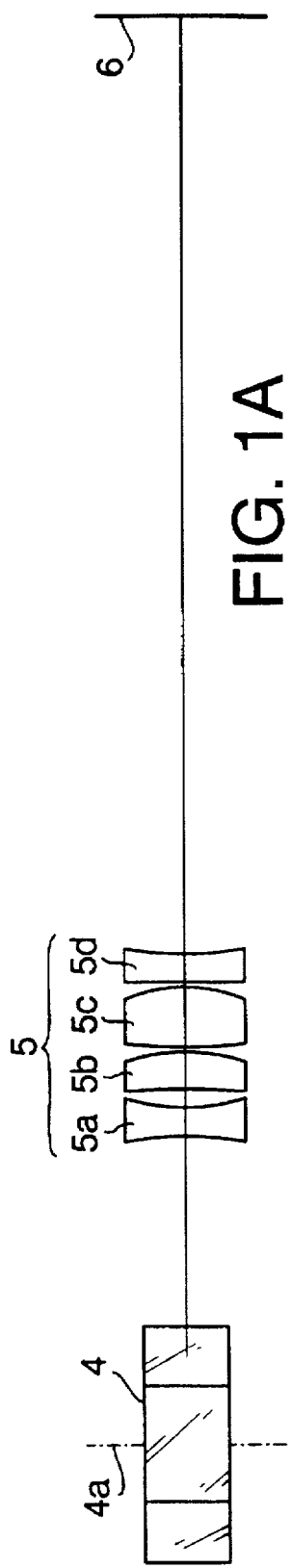
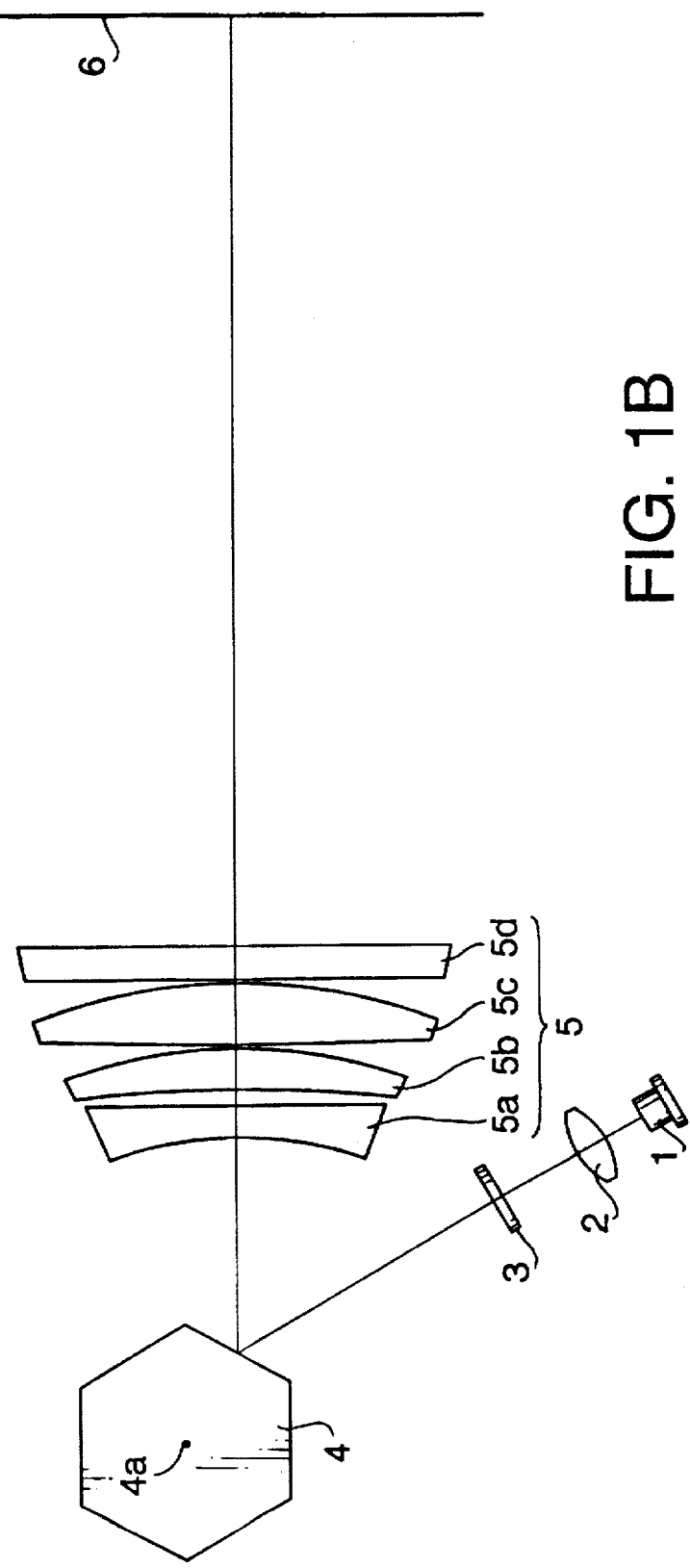

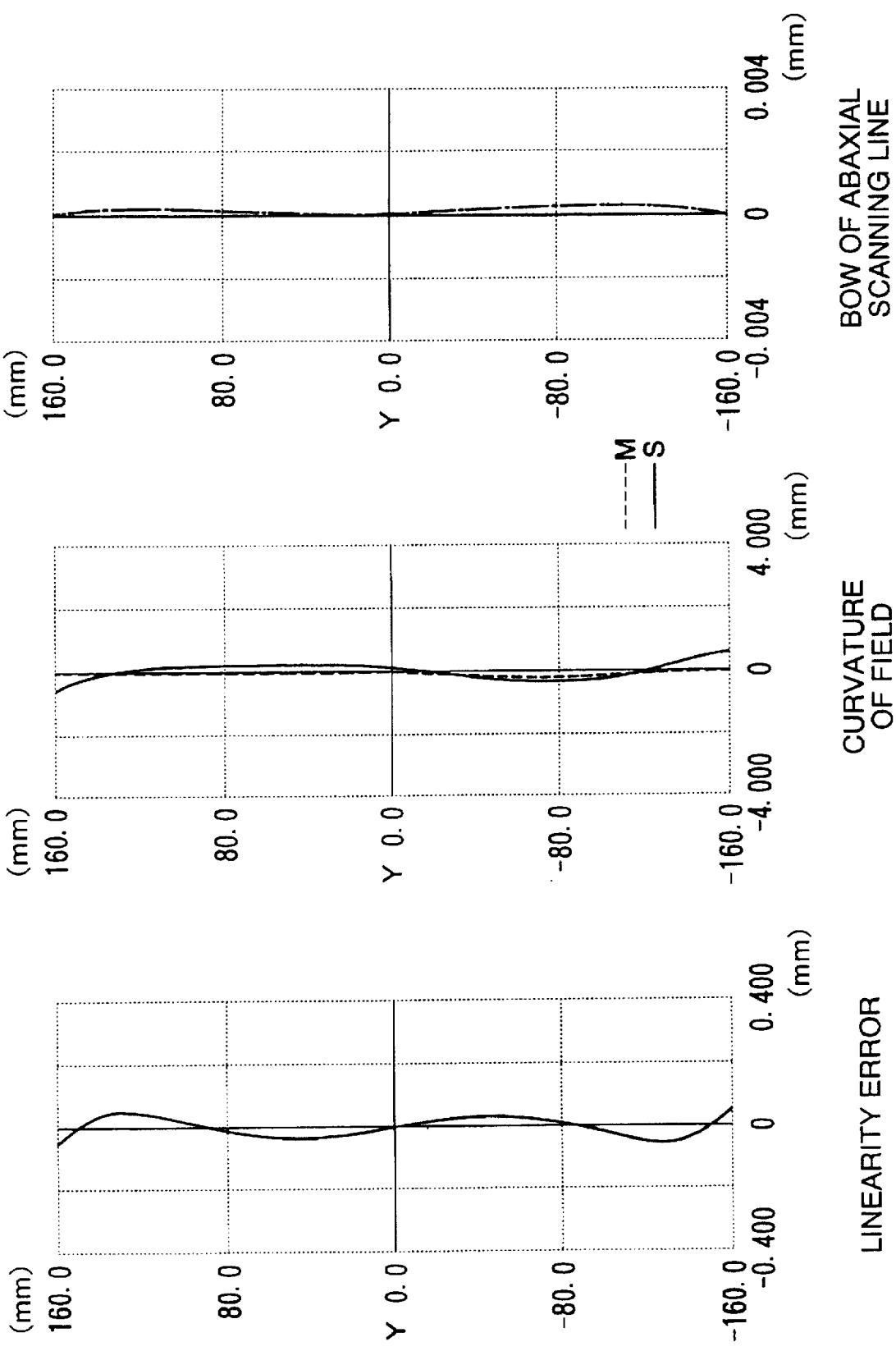

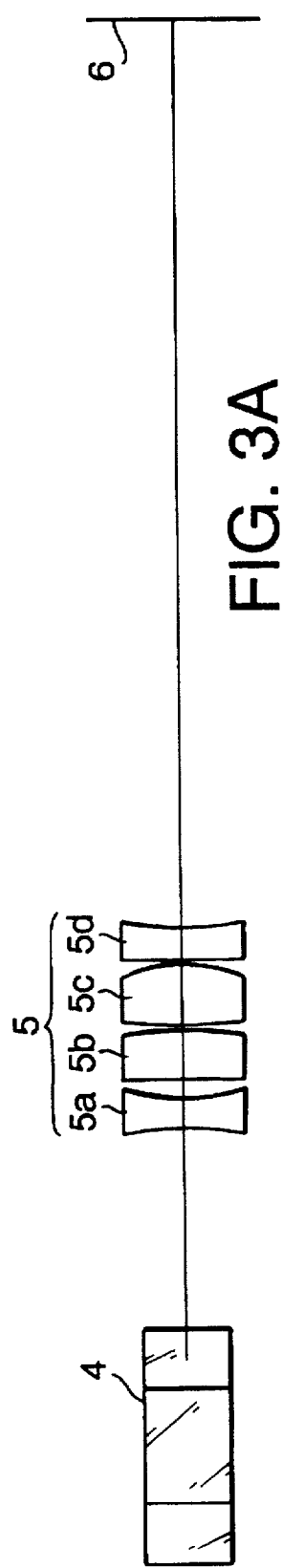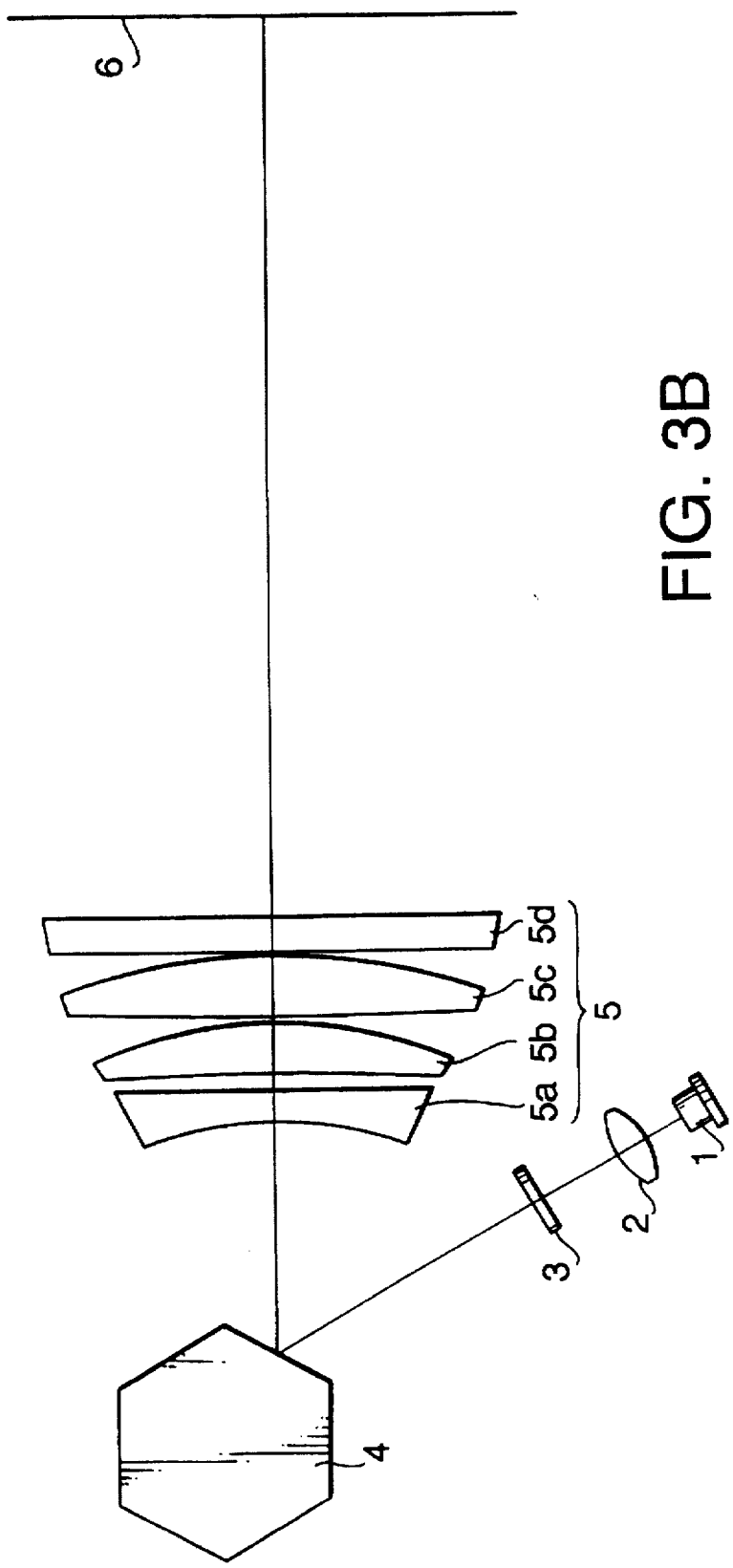

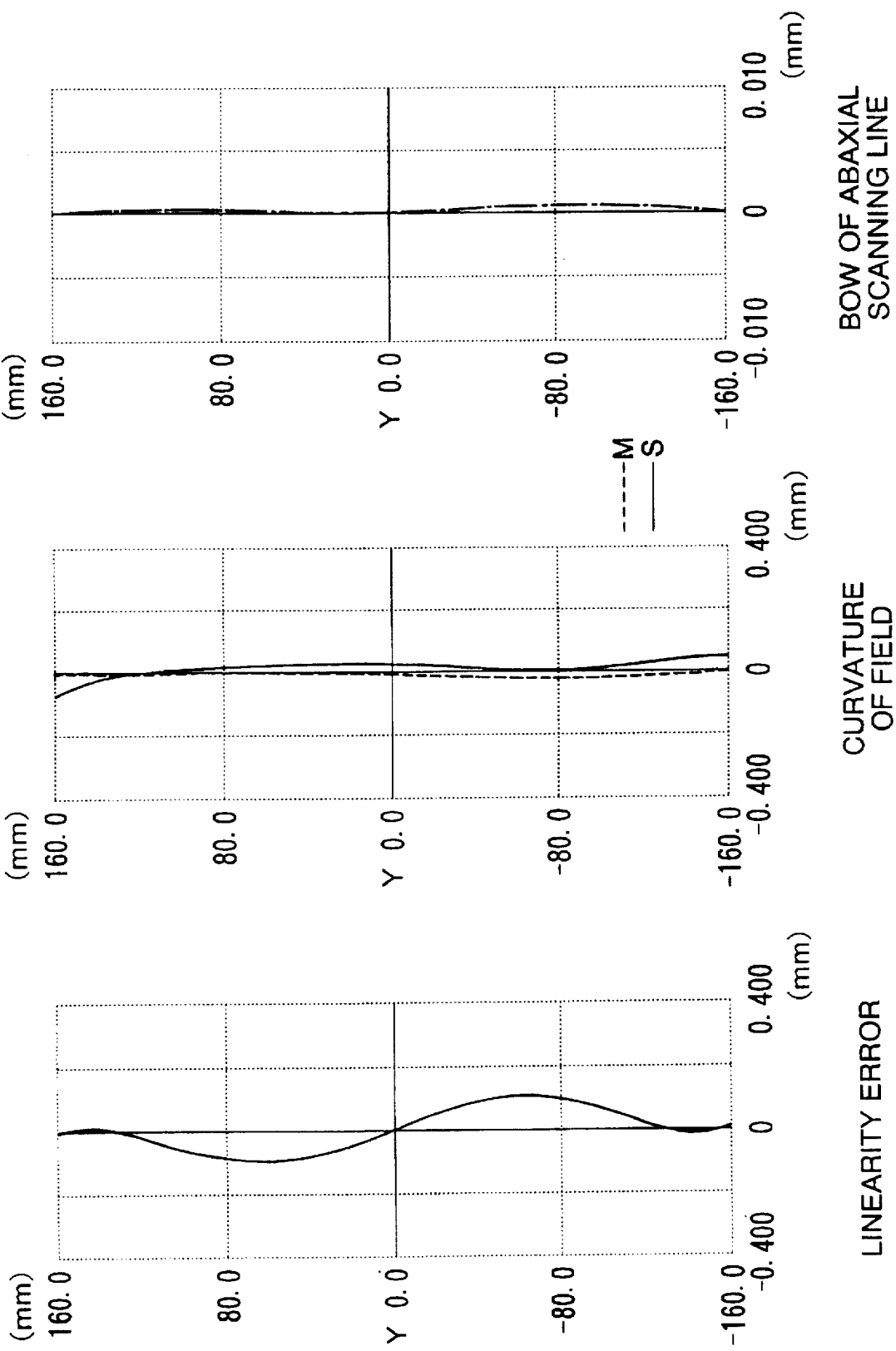

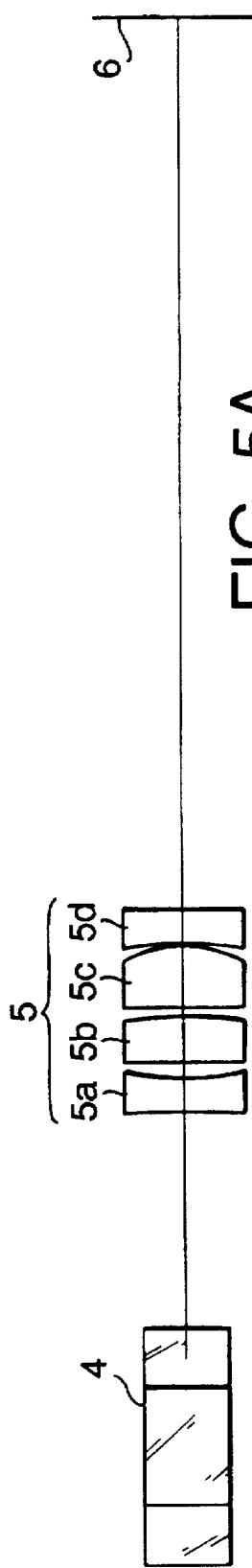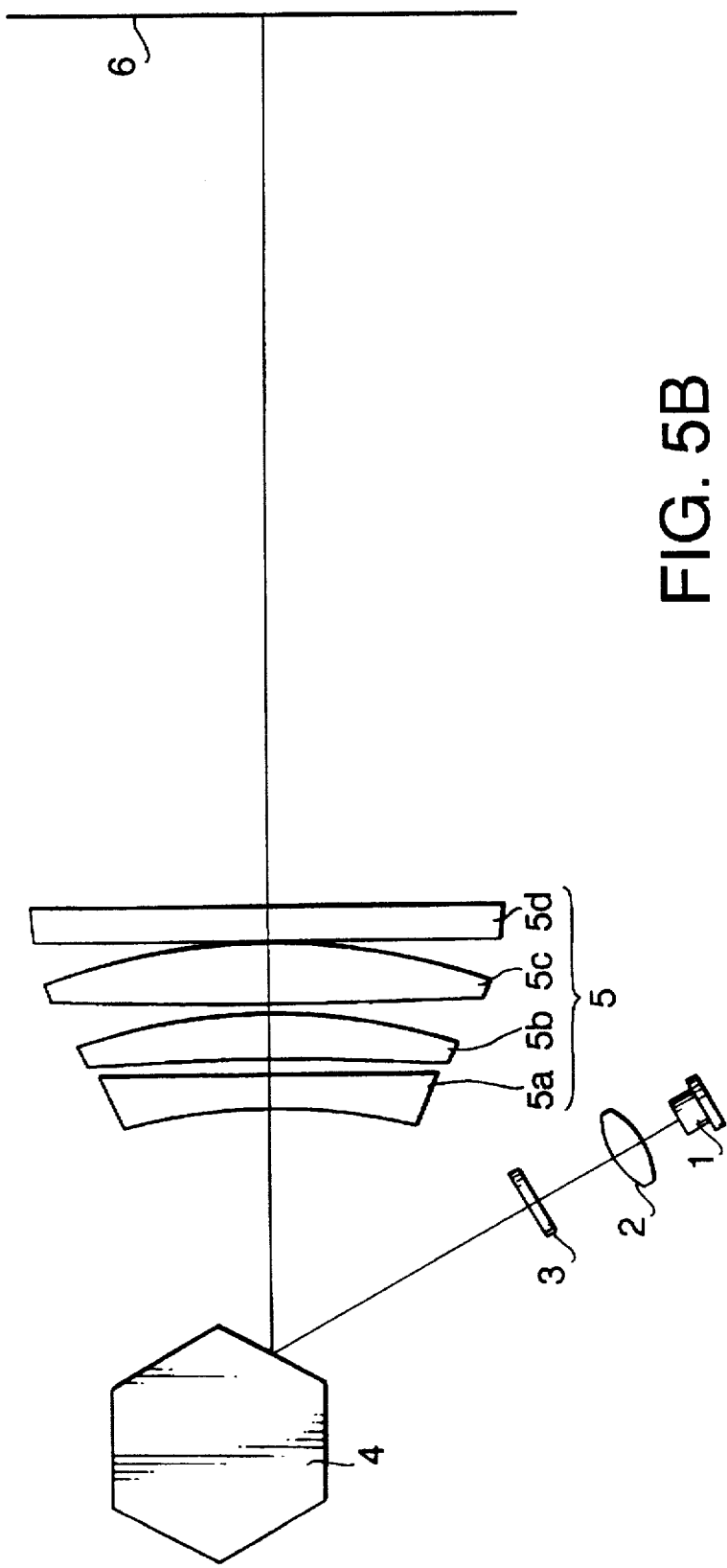

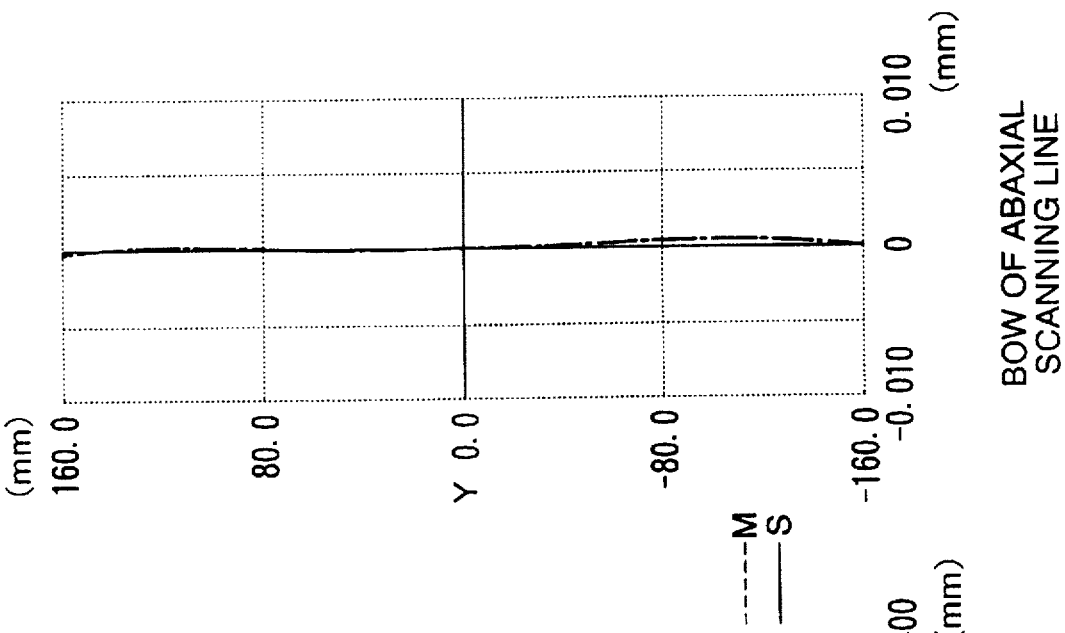
FIG. 6A  LINEARITY ERROR
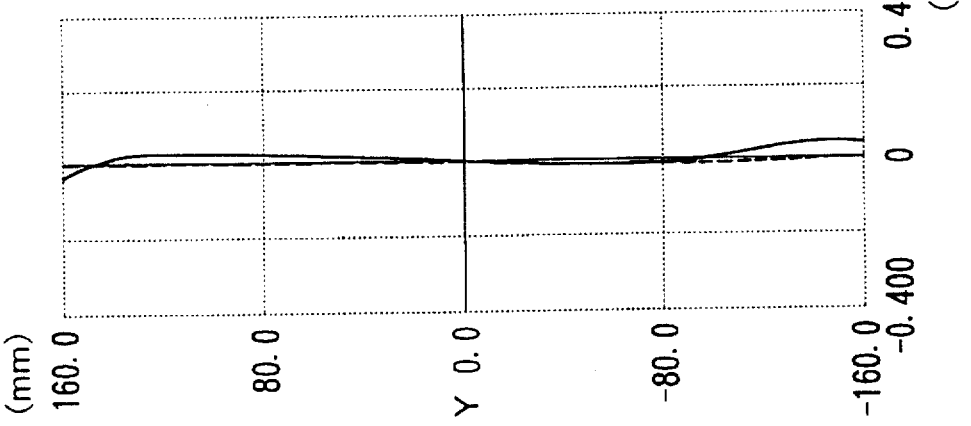
FIG. 6B  CURVATURE OF FIELD
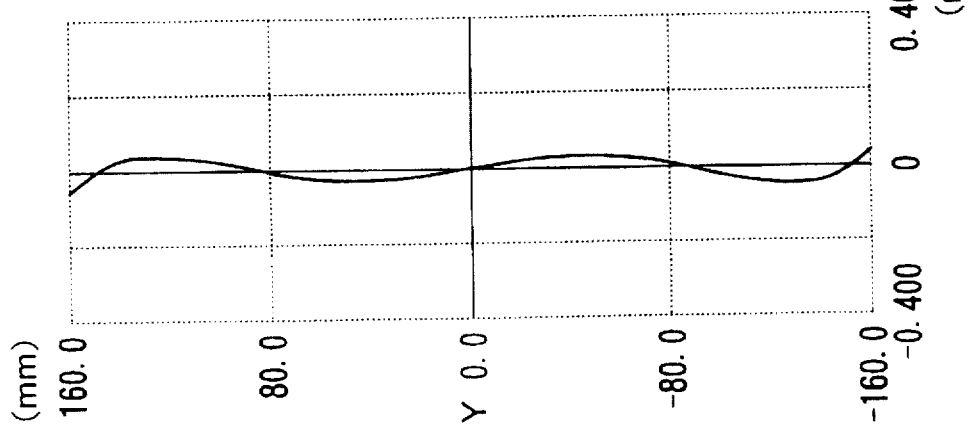
FIG. 6C  BOW OF ABAXIAL SCANNING LINE

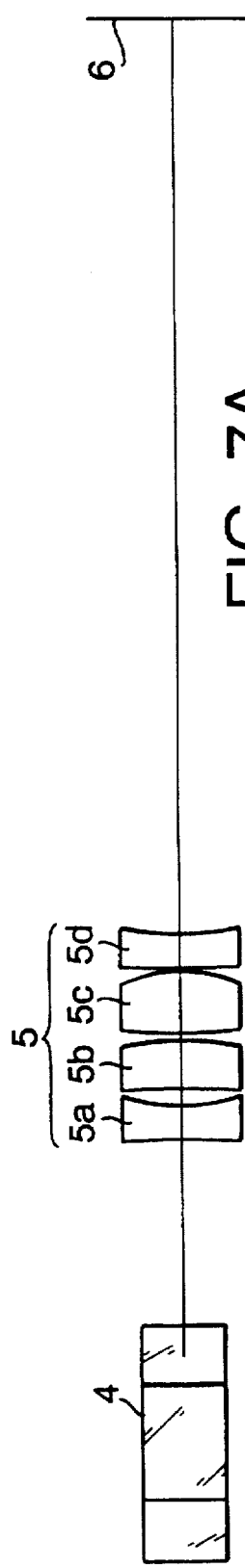
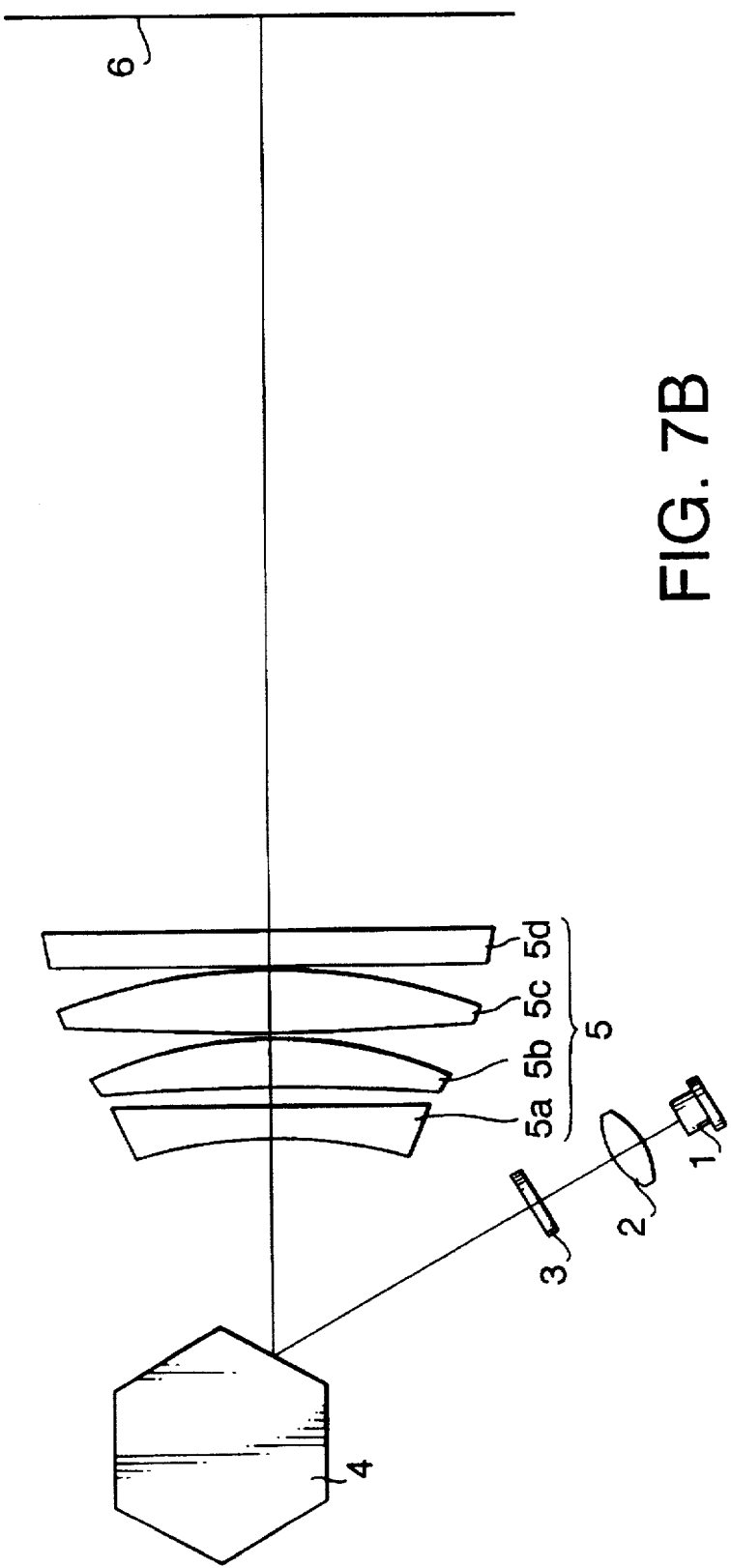

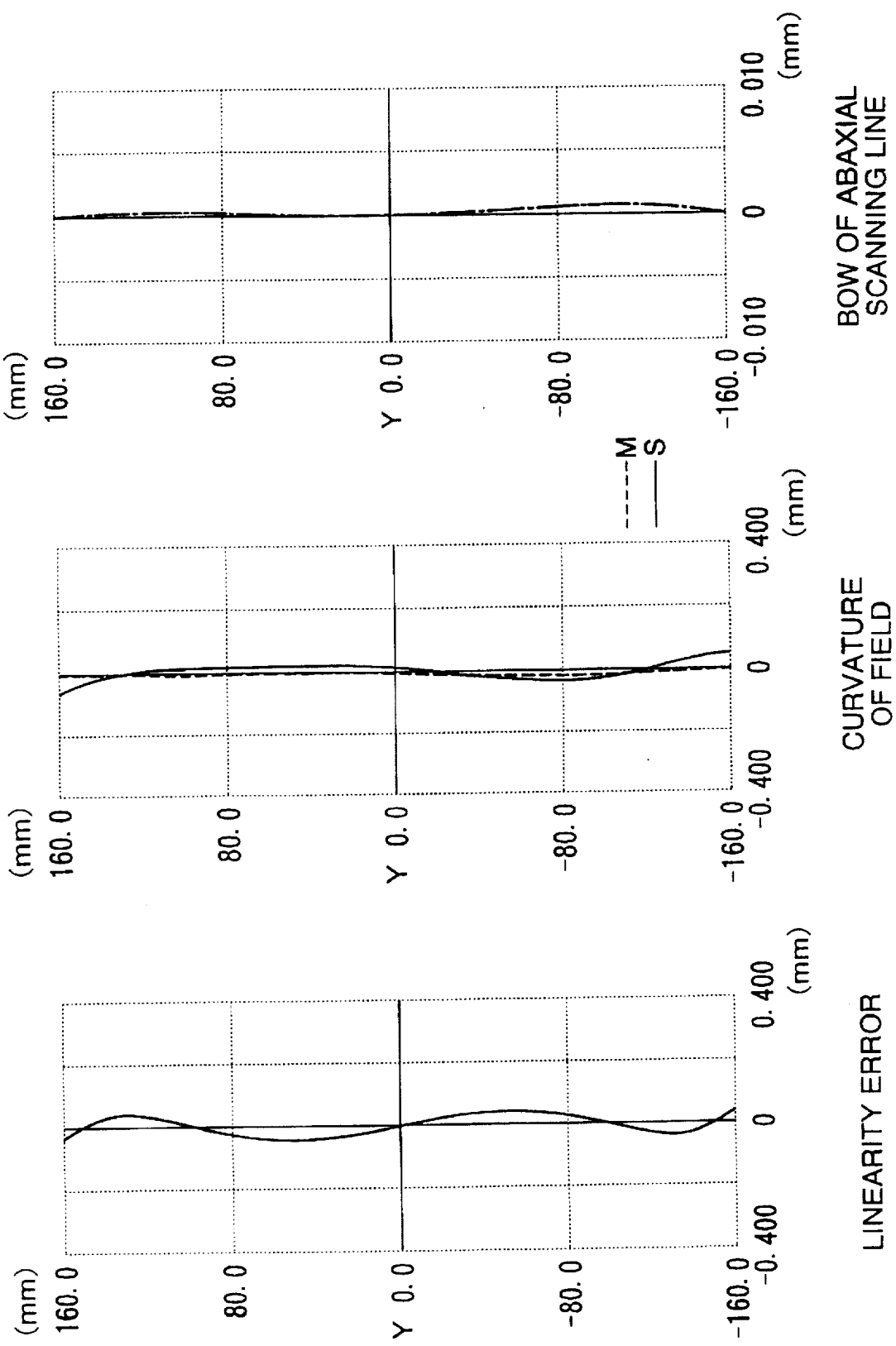

SCANNING LENS

BACKGROUND OF THE INVENTION

The present invention relates to a scanning lens used for a laser beam printer, a laser facsimile machine or the like.

A known scanning lens is disclosed in Japanese Patent Laid Open publication No. Sho 62-172317. The scanning lens disclosed consists of a first lens, a second lens and a third lens arranged in this order between a polygonal mirror and an object surface to be scanned.

The first lens is a negative anamorphic lens in which the negative refractive power in an auxiliary scanning direction is larger than that in a main scanning direction. The second lens is a meniscus shaped positive lens for which both surfaces are spherical. The third lens is a positive anamorphic lens in which the positive refractive power in the auxiliary scanning direction is larger than that in the main scanning direction.

The term "the main scanning direction" is defined as a direction that corresponds to the scanning direction of the laser spot on the object surface, and "the auxiliary scanning direction" is defined as a direction perpendicular to the main scanning direction in a plane perpendicular to the optical axis.

The scanning lens disclosed in the aforementioned Japanese patent publication, however, is not suitable for a high resolution printing system because the spot diameter in the auxiliary scanning direction varies greatly due to a relatively large curvature of field in the auxiliary scanning direction.

Also, in order to use the lens in a multi-beam scanning optical device, it is important to reduce bow of an abaxial scanning line in the auxiliary scanning direction. The abaxial scanning line is defined as follows. In the multi-beam optical device, a plurality of scanning lines are formed for each scan. The scanning lines are formed on the object surface as locus of the scanning light spots. The scanning lines are separated in the auxiliary scanning direction and the scanning lines that do not cross the optical axis of the scanning lens are defined as abaxial scanning lines. A scanning line that crosses the optical axis is defined as a center scanning line.

With the conventional scanning lens that comprises three lenses, it is difficult to correct both the curvature of field in the auxiliary scanning direction and the bow of the abaxial scanning line. For example, the scanning lens disclosed in the aforementioned Japanese patent publication can reduce the bow of the abaxial scanning line but cannot reduce the curvature of field in the auxiliary scanning direction. Conversely, if the curvature of field is compensated, the bow of the abaxial scanning line increases.

SUMMARY OF THE INVENTION

It is therefore an object of the present invention to provide a scanning lens that compensates curvature of field in the auxiliary scanning direction and that also suitable to be applied to a multi-beams scanning optical device.

According to an aspect of the present invention, a scanning lens is provided which converges light deflected by a deflector onto a surface to be scanned, the scanning lens comprises a first lens having a negative power in both of a main scanning direction and an auxiliary scanning direction, a second lens having a positive power in both of the main scanning direction and the auxiliary scanning direction, a third lens having a positive power in both of the main scanning direction and the auxiliary scanning direction, and a fourth lens that is provided with a cylindrical surface having a negative power in the auxiliary scanning direction. The first, second, third and fourth lenses are arranged in order from the deflector.

The first, second and third lenses may be designed so that curvature of field in the auxiliary scanning direction is reduced. A bow of an abaxial scanning line, which cannot be corrected by the first, second and third lenses, can be corrected by the cylindrical surface of the fourth lens.

If the fourth lens is not provided, the abaxial scanning line bends toward the center scanning line in the peripheral portions of a scanning range when the first, second and third lenses are designed to reduce the curvature of field. The negative power of the cylindrical surface of the fourth lens in the auxiliary scanning direction functions so that the abaxial scanning line departs from the center, scanning line. Further, the negative power of the cylindrical surface is larger for light rays having larger angles of incidence in the main scanning direction. Since the light ray directed to the peripheral portion of the scanning range has larger incident angle, the cylindrical surface can compensate the bow (bend) of the abaxial scanning line in the peripheral portions of the scanning range.

BRIEF DESCRIPTION OF THE DRAWINGS

FIGS. 1A and 1B are a lens diagram showing a main part of the scanning optical system according to a first embodiment, FIGS. 2A, 2B and 2C show various aberrations of the scanning optical system of the first embodiment, FIGS. 3A and 3B are a lens diagram showing a main part of the scanning optical system according to a second embodiment, FIGS. 4A, 4B and 4C show various aberrations of the scanning optical system of the second embodiment, FIGS. 5A and 5B are a lens diagram showing a main part of the scanning optical system according to a third embodiment, FIGS. 6A, 6B and 6C show various aberrations of the scanning optical system of the third embodiment, FIGS. 7A and 7B are a lens diagram showing a main part of the scanning optical system according to a fourth embodiment, and FIGS. 8A, 8B and 8C show various aberrations of the scanning optical system of the fourth embodiment.

DETAILED DESCRIPTION OF THE PREFERRED EMBODIMENTS

Preferred embodiment of the scanning lens according to the present invention are described. The scanning lens of the embodiment is applied to a scanning optical device such as a laser printer as shown in FIG. 1. FIG. 1A is a diagram in the auxiliary scanning direction and FIG. 1B is a diagram in the main scanning direction.

A laser beam emitted from a light source 1 such as a semiconductor laser is converted into a parallel beam by means of a collimator lens 2, and passed through a cylindrical lens 3 to be incident on a polygonal mirror 4 as a deflector. The polygonal mirror 4 is provided with six mirror surfaces and deflects the laser beam when the polygonal mirror 4 is driven to rotate about an axis 4a. The deflected laser beam scanned through an fθ lens 5 as a scanning lens and converged on an object surface 6.

The cylindrical lens 3 has a positive power only in the auxiliary scanning direction in order to form a linear image near the mirror surface of the polygonal mirror 4. Thus, the laser beam incident to the fθ lens 5 is substantially parallel in the main scanning direction and divergent in the auxiliary scanning direction. The fθ lens 5 includes four lenses and has a positive power in both of the main scanning direction and the auxiliary scanning direction. The positive power in the auxiliary scanning direction is larger (more positive) than that in the main scanning direction in order to re-image the linear image as an approximately circular light spot on the object surface 6. Since the position of the mirror surface of the polygonal mirror 4 is substantially optically conjugate with the object surface 6, deviations of the scanning line due to an inclination error of the mirror surface of the polygonal mirror 4 can be reduced.

The fθ lens 5 comprises a first lens 5a having a negative power in both of a main scanning direction and an auxiliary scanning direction, a second lens 5b having a positive power in both of the main scanning direction and the auxiliary scanning direction, a third lens 5c having a positive power in both of the main scanning direction and the auxiliary scanning direction, and a fourth lens 5d having a negative power in the auxiliary scanning direction and having no power in the main scanning direction. The first, second, third and fourth lenses 5a–5d are arranged in order from the polygonal mirror 4. The shapes of each surface of the lenses 5a–5d are described below. In the following description, the surface at the side of the polygonal mirror 4 is defined as an incident side surface and the surface at the side of the object surface 6 is defined as an exit side surface.

The incident side surface of the first lens 5a is a concave spherical surface and the exit side surface thereof is a cylindrical surface having a negative power only in the auxiliary scanning direction. The negative power of the first lens 5a in the auxiliary scanning direction is larger (i.e., more negative) than that in the main scanning direction.

The incident side surface of the meniscus shaped second lens 5b is a concave spherical surface and the exit side surface thereof is a convex toric surface or a convex spherical surface. When the exit side surface of the second lens 5b is a toric surface, the positive power of the second lens 5b in the auxiliary scanning direction is larger (i.e., more positive) than that in the main scanning direction.

The incident side surface of the double convex third lens 5c is a convex spherical surface and the exit side surface thereof is a convex toric surface which has a larger positive power in the auxiliary scanning direction than in the main scanning direction.

The fourth lens 5d has a flat surface at one side and the other side is a cylindrical surface having a negative power in the auxiliary scanning direction.

Four numerical embodiments will be described below.

FIRST EMBODIMENT

FIG. 1 shows the arrangement of the scanning optical system according to the first embodiment. FIG. 1A shows the arrangement of the elements from the polygonal mirror 4 to the object surface 6 in the auxiliary scanning direction. FIG. 1B shows the arrangement in the main scanning direction. The numerical construction of the system of this embodiment is described in TABLE 1. In the table, ry denotes a radius of curvature in the main scanning direction, rz denotes a radius of curvature in the auxiliary scanning direction (blank means a rotationally symmetric surface, i.e., rz=ry), d denotes a distance between the surfaces along the optical axis and n780 denotes the refractive index at a wavelength of 780 nm.

In the first embodiment, the surface numbers 1 and 2 represent the surfaces of the cylindrical lens 3, the surface number 3 is the polygonal mirror 4, the surface numbers 4 and 5 represent the surfaces of the first lens 5a, the surface numbers 6 and 7 represent the surfaces of the second lens 5b, the surface numbers 8 and 9 represent the surfaces of the third lens 5c and the surface numbers 10 and 11 represent the surfaces of the fourth lens 5d moving from the light source 1 to the object surface 6.

TABLE 1

| Surface number | ry | rz | d | n780 |
|---|---|---|---|---|
| 1 | ∞ | 43.410 | 4.000 | 1.51072 |
| 2 | ∞ | — | 84.910 | |
| 3 | ∞ | — | 62.433 | |
| 4 | −117.431 | — | 10.000 | 1.71230 |
| 5 | ∞ | 80.815 | 5.000 | |
| 6 | −521.322 | — | 13.033 | 1.58252 |
| 7 | −139.757 | −110.120 | 1.286 | |
| 8 | 1698.602 | — | 18.000 | 1.71230 |
| 9 | −159.933 | −38.787 | 1.000 | |
| 10 | ∞ | — | 10.000 | 1.51072 |
| 11 | ∞ | 167.453 | 371.756 | |

FIG. 2A shows linearity error, FIG. 2B shows curvature of field (M: Main scanning direction, S: Auxiliary scanning (Sub-scanning) direction), FIG. 2C shows bow of the abaxial scanning line that, at the center of scanning, passes 0.12 mm from the optical axis in the auxiliary scanning direction. The vertical axis Y of each graph represents a distance from the center of the scanning on the object surface 6 and the horizontal axis represents the amount of aberration. The unit for each axis is millimeter.

SECOND EMBODIMENT

FIG. 3 shows the arrangement of the scanning optical system according to the second embodiment. FIG. 3A shows the arrangement of the elements from the polygonal mirror 4 to the object surface 6 in the auxiliary scanning direction. FIG. 3B shows the arrangement in the main scanning direction.

The correspondences between the surface numbers and the elements are the same as in the first embodiment. Numerical construction is shown in TABLE 2. FIGS. 4A, 4B and 4C show the linearity error, the curvature of field and the bow of the abaxial scanning line respectively.

TABLE 2

| Surface number | ry | rz | d | n780 |
|---|---|---|---|---|
| 1 | ∞ | 43.410 | 4.000 | 1.51072 |
| 2 | ∞ | — | 84.910 | |
| 3 | ∞ | — | 71.268 | |
| 4 | −149.392 | — | 10.000 | 1.70608 |
| 5 | ∞ | 69.034 | 5.000 | |
| 6 | −587.331 | — | 12.809 | 1.58252 |
| 7 | −163.585 | — | 1.356 | |
| 8 | 1612.714 | — | 18.000 | 1.70486 |
| 9 | −178.004 | −36.313 | 1.000 | |
| 10 | ∞ | — | 10.000 | 1.51072 |
| 11 | ∞ | 156.635 | 359.495 | |

THIRD EMBODIMENT

FIG. 5 shows the arrangement of the scanning optical system according to the third embodiment. FIG. 5A shows the arrangement of the elements from the polygonal mirror 4 to the object surface 6 in the auxiliary scanning direction. FIG. 5B shows the arrangement in the main scanning direction.

The correspondences between the surface numbers and the elements are the same as in the first embodiment. Numerical construction is shown in TABLE 3. FIGS. 6A, 6B and 6C show the linearity error, the curvature of field and the bow of the abaxial scanning line respectively.

TABLE 3

| Surface number | ry | rz | d | n780 |
|---|---|---|---|---|
| 1 | ∞ | 43.410 | 4.000 | 1.51072 |
| 2 | ∞ | — | 84.910 | |
| 3 | ∞ | — | 72.139 | |
| 4 | −151.195 | — | 10.000 | 1.71230 |
| 5 | ∞ | 60.291 | 5.000 | |
| 6 | −674.205 | — | 13.234 | 1.58252 |
| 7 | −163.941 | −123.641 | 3.238 | |
| 8 | 1761.439 | — | 18.000 | 1.71230 |
| 9 | −184.834 | −36.067 | 1.000 | |
| 10 | ∞ | −123.110 | 10.000 | 1.51072 |
| 11 | ∞ | — | 360.622 | |

FOURTH EMBODIMENT

FIG. 7 shows the arrangement of the scanning optical system according to the fourth embodiment. FIG. 7A shows the arrangement of the elements from the polygonal mirror 4 to the object surface 6 in the auxiliary scanning direction. FIG. 7B shows the arrangement in the main scanning direction.

The correspondences between the surface numbers and the elements are the same as in the first embodiment. Numerical construction is shown in TABLE 4. FIGS. 8A, 8B and 8C show the linearity error, the curvature of field and the bow of the abaxial scanning line respectively.

TABLE 4

| Surface number | ry | rz | d | n780 |
|---|---|---|---|---|
| 1 | ∞ | 43.410 | 4.000 | 1.51072 |
| 2 | ∞ | — | 84.910 | |
| 3 | ∞ | — | 64.676 | |
| 4 | −116.049 | — | 10.000 | 1.60919 |
| 5 | ∞ | 62.644 | 5.134 | |
| 6 | −793.448 | — | 15.112 | 1.51072 |
| 7 | −129.796 | −95.128 | 2.306 | |
| 8 | 1456.936 | — | 18.000 | 1.63552 |
| 9 | −176.931 | −34.956 | 1.000 | |
| 10 | ∞ | — | 10.000 | 1.48261 |
| 11 | ∞ | 117.632 | 365.937 | |

As shown in FIGS. 2, 4, 6 and 8, the fθ lens 5 of each of the embodiments provides low curvatures of field in both of the main scanning direction and the auxiliary scanning direction, and it also provides a low amount of bow of the abaxial scanning line within a scanning range of ±160 mm. Such a scanning range covers A3 size paper. And thus, the fθ lenses of the embodiments can improve the quality of a multi-beam scanning optical device.

The present disclosure relates to subject matter contained in Japanese Patent Application No. HEI 07-348045, filed on Dec. 15, 1995, which is expressly incorporated herein by reference in its entirety.

What is claimed is:

1. A scanning lens that converges a light deflected by deflector onto a surface to be scanned, said scanning lens comprising:

a first lens having a negative power in both a main scanning direction and an auxiliary scanning direction;

a second lens having a positive power in both the main scanning direction and the auxiliary scanning direction;

a third lens having a positive power in both the main scanning direction and the auxiliary scanning direction; and a fourth lens provided with a cylindrical surface having a negative power in the auxiliary scanning direction, wherein said first, second, third and fourth lenses are arranged in this order from said deflector.

2. The scanning lens according to claim 1, wherein said first lens is provided with a cylindrical surface having a negative power in the auxiliary scanning direction.

3. The scanning lens according to claim 2, wherein a deflector-side surface of said first lens is formed as a concave spherical surface.

4. The scanning lens according to claim 1, wherein said third lens is provided with a toric surface having a larger positive power in the auxiliary scanning direction than in the main scanning direction.

5. The scanning lens according to claim 4, wherein a deflector-side surface of said third lens is formed as a convex spherical surface, and the other surface of said third lens is formed as a convex toric surface.

6. The scanning lens according to claim 1, wherein one lens surface of said fourth lens is formed as a flat surface and the other surface is said cylindrical surface.

7. The scanning lens according to claim 1, wherein a deflector-side surface of said first lens is formed as a concave spherical surface.

8. The scanning lens according to claim 1, wherein said second lens is formed as a meniscus lens, a convex surface of said second lens being directed to said surface to be scanned.

9. The scanning lens according to claim 1, wherein a deflector-side surface of said third lens is formed as a convex spherical surface, and the other surface of said third lens is formed as a convex toric surface.

* * * * *